Patented July 6, 1926.

1,591,563

UNITED STATES PATENT OFFICE.

OTTO RUFF, OF BRESLAU, GERMANY.

MANUFACTURE OF PLASTIC MATERIAL OUT OF NOT-PLASTIC OXIDES.

No Drawing. Application filed November 18, 1922, Serial No. 601,880, and in Germany November 24, 1921.

It has been heretofore proposed to produce plastic material, from non-plastic oxids, such as zirconium dioxide, thorium oxide, aluminium oxide, or rare earths, by grinding the same with water continuously for several days. In this process also it has been proposed to add substances which are capable of converting a portion of the oxides into colloidal condition, but the processes above mentioned are not entirely practical on account of the enormous amount of power and of time employed. In accordance with the present invention plastic oxides of the kind above referred to can be produced by a simple heating treatment, it being advisable to heat those salts in which the acid constituent (acid radical) can be removed by heat, without producing any fusion of sintering of the remaining oxide. The oxalates and the nitrates of the metals referred to are especially satisfactory for this purpose, these being dissociated at relatively low temperatures, forming finely subdivided oxides. When the salts in question contain water, as water of crystallization for example, and if the salts melt in the water of crystallization or other water formed, it is advisable, before subjecting them to the decomposition referred to, to remove the water of crystallization at a relatively low temperature without melting the same. In some cases the salts require a very high temperature, and in such cases substances should be added to the salt, either before or during the heating process, capable of assisting in the decomposition, so as to make the decomposition take place at a lower temperature, namely, a temperature below which fusion of the oxides or sintering of the oxides, would occur. As an example of such substances to be added, steam can be added, in the decomposition of the chlorides, or the metals in question.

After the heating to produce the oxides in their finely divided state, they are subjected to a treatment with water containing electrolytes, such, for instance, as the nitrates and the chlorides of the same metal which are under treatment, or in place of the nitrates or chlorides, the corresponding free acids can be used, whereby nitrates or chlorides will be formed. In place of using the salts of the same metal, salts of other metals, and particularly of those salts which are readily decomposed by hydrolysis can be used, the oxides being thereby liberated in such a manner as to produce a plastic composition, with the zirconium oxides etc. Since the amount of electrolytes to be used will vary a good deal, depending upon the particular electrolytes used and the particular oxides under treatment, no general rules can be laid down for the amount to be used, except that a sufficient amount of this should be used to produce the desired degree of plasticity.

In carrying out this subsequent heating treatment, it is advisable to stop the same before the complete decomposition of the electrolytes added, whereby producing a more highly plastic product.

In case the above method produces too great a degree of plasticity, this can be reduced by incorporating the product with a desired amount of the more highly heated oxides which are either non-plastic or of a very low degree of plasticity. In some cases a small amount of sal-ammoniac can be added, or the oxides can be impregnated with a solution thereof, the product dried and again calcined.

I claim:—

A process of making plastic material which comprises manufacturing finely divided oxides by the heating of salts which liberate the oxides without fusion of the latter, and without sintering of the latter to a temperature capable of producing the oxides in a non-fused and non-sintered state, and subsequently heating the same with water and an electrolyte capable of imparting plasticity so as to convert the oxides into a plastic condition, without a long grinding operation.

In testimony whereof I affix my signature.

DR. OTTO RUFF.